United States Patent

Stein et al.

Patent Number: 5,806,882
Date of Patent: Sep. 15, 1998

[54] VEHICLE OCCUPANT PROTECTION APPARATUS

[75] Inventors: Russell E. Stein, Leonard; Edward F. Elmer, Auburn Hills; Gary A. Herbst, East China, all of Mich.

[73] Assignee: TRW Vehicle Safety Systems Inc., Lyndhurst, Ohio

[21] Appl. No.: 974,985

[22] Filed: Nov. 20, 1997

[51] Int. Cl.$^6$ .................................................. B60R 21/22
[52] U.S. Cl. .................................... 280/730.2; 280/728.2; 280/728.3
[58] Field of Search .............................. 280/728.1, 728.2, 280/728.3, 730.1, 730.2, 740

[56] References Cited

U.S. PATENT DOCUMENTS

| | | |
|---|---|---|
| 4,153,273 | 5/1979 | Risko . |
| 4,988,119 | 1/1991 | Hartmeyer . |
| 5,306,039 | 4/1994 | Nakayama . |
| 5,456,488 | 10/1995 | Bauer . |
| 5,518,266 | 5/1996 | O'Docherty et al. . |

OTHER PUBLICATIONS

U.S. Patent Appln. Serial No. 08/874,955, filed Jun. 13, 1997, entitled "Vehicle Occupant Protection Apparatus".

*Primary Examiner*—Eric D. Culbreth
*Attorney, Agent, or Firm*—Tarolli, Sundheim, Covell Tummino & Szabo

[57] ABSTRACT

An apparatus (10) includes an inflatable vehicle occupant protection device (12), a cover (32) for the protection device (12), and a pair of clamping parts (34, 42) with a fastener structure (36, 40). The protection device (12) comprises a first compressively deflectable structure. The cover (32) comprises a second compressively deflectable structure. The fastener structure (36, 40) comprises a stud (36) extending longitudinally between the clamping parts (34, 42), and applies a clamping load to the clamping parts (34, 42). At least one of the deflectable structures (12, 32) is compressively stressed by the clamping load. The apparatus (10) further includes a bushing (48) which is indeflectable under the clamping load. The bushing (48) extends over the stud (36) fully between the clamping parts (34, 42) to space the clamping parts (34, 42) from each other. Accordingly, the spacing between the clamping parts (34, 42) is unaffected by creep in the compressively stressed deflectable structure.

10 Claims, 5 Drawing Sheets

VEHICLE OCCUPANT PROTECTION APPARATUS

FIELD OF THE INVENTION

The present invention relates to an apparatus for helping to protect a vehicle occupant, and particularly relates to an apparatus including an inflatable vehicle occupant protection device.

BACKGROUND OF THE INVENTION

An inflatable vehicle occupant protection device, such as an air bag, is inflated when a vehicle experiences a crash. Inflation fluid is then directed to flow from an inflator into the air bag to inflate the air bag. When the air bag is inflated, it extends into the vehicle occupant compartment to help protect an occupant of the vehicle from a forceful impact with parts of the vehicle as a result of the crash.

An air bag and an inflator are typically installed in a vehicle as parts of an air bag module. The module is an assembly of parts that are interconnected separately from the vehicle, and may include a cover which conceals the air bag and the other parts of the module from view in the vehicle occupant compartment. The cover includes a deployment door and may also include mounting flaps which, together with a portion of the air bag, are clamped between rigid metal parts of the module.

The deployment door on the cover is opened by the force of the fluid pressure in the inflating air bag. In addition to opening the deployment door, the force of the fluid pressure tends to pull the mounting flaps and the clamped portion of the air bag outward from the module. Therefore, the mounting flaps and the clamped portion of the air bag are engaged with a clamping force that helps to resist such movement.

SUMMARY OF THE INVENTION

In accordance with the present invention, an apparatus comprises an inflatable vehicle occupant protection device, a cover for the protection device, and a pair of clamping parts with a fastener structure. The protection device comprises a first compressively deflectable structure. The cover comprises a second compressively deflectable structure. The fastener structure comprises a stud extending longitudinally between the clamping parts, and applies a clamping load to the clamping parts. At least one of the deflectable structures is compressively stressed by the clamping load.

The apparatus further comprises a bushing which is indeflectable under the clamping load. The bushing extends over the stud fully between the clamping parts to space the clamping parts from each other. Accordingly, the present invention provides a "hard" clamped joint, i.e., a joint in which the spacing between the clamping parts is unaffected by creep in a compressively deflectable structure that is stressed between the clamping parts.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
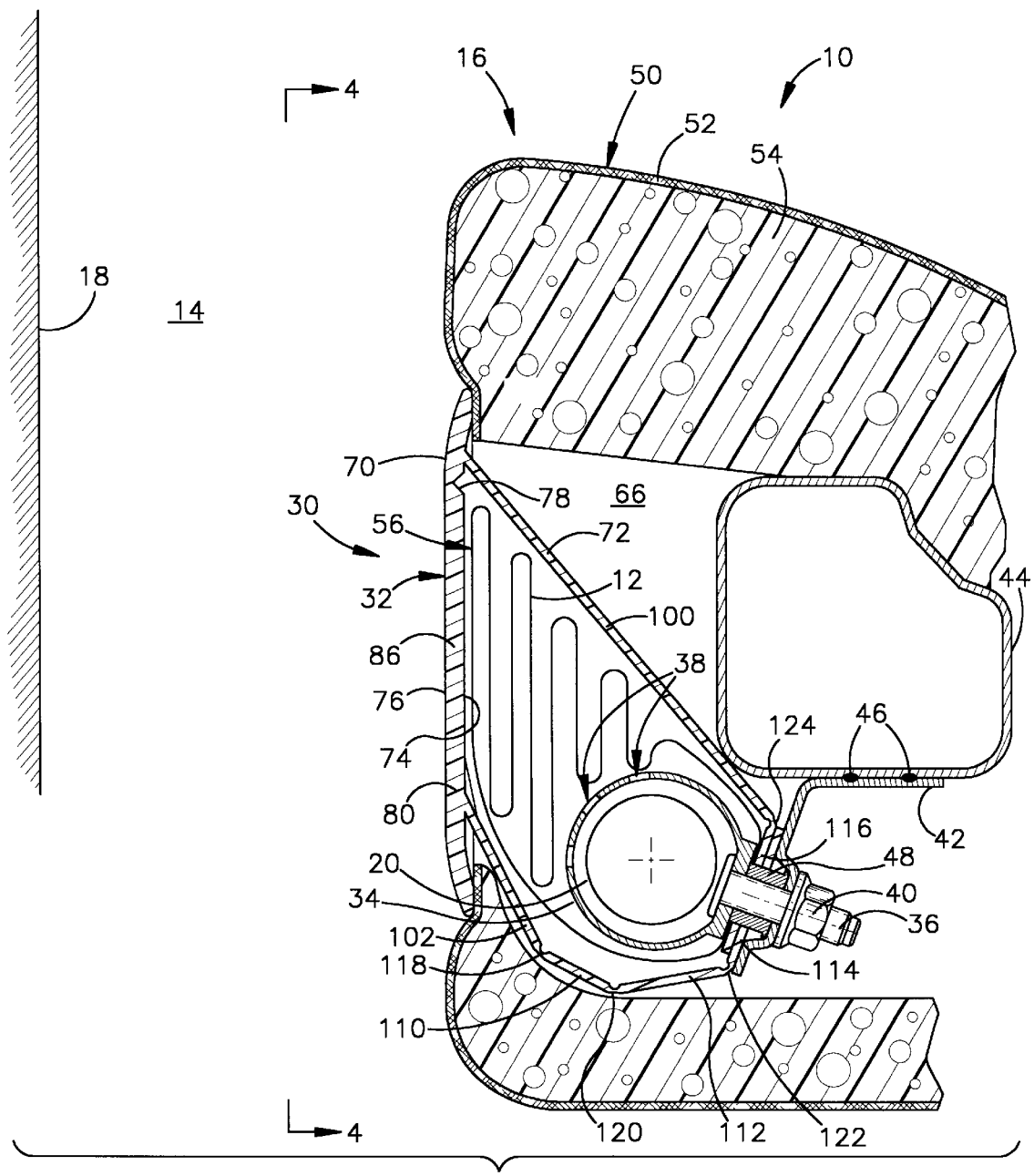
FIG. 1 is a schematic view of an apparatus comprising a preferred embodiment of the present invention.

An apparatus 10 comprising a preferred embodiment of the present invention is shown in FIG. 1. The apparatus 10 includes a particular type of inflatable vehicle occupant protection device 12 which is known as an air bag. The air bag 12 is inflatable from an uninflated condition, as shown in FIG. 1, to an inflated condition, as shown partially in FIG. 2. When the air bag 12 is in the inflated condition of FIG. 2, it extends into the vehicle occupant compartment 14 between a vehicle seat 16 and an adjacent door 18 at the side of the vehicle. The air bag 12 may be formed of any suitable air bag material known in the art, including woven materials and plastic films.

The apparatus 10 further includes an inflator 20 comprising a source of inflation fluid for inflating the air bag 12. As known in the art, the inflator 20 is a generally cylindrical part, and may contain ignitable gas generating material for generating a large volume of inflation gas. The inflator 20 may alternatively contain a stored quantity of pressurized inflation fluid, or a combination of pressurized inflation fluid and ignitable material for heating the inflation fluid.

Figure 2:
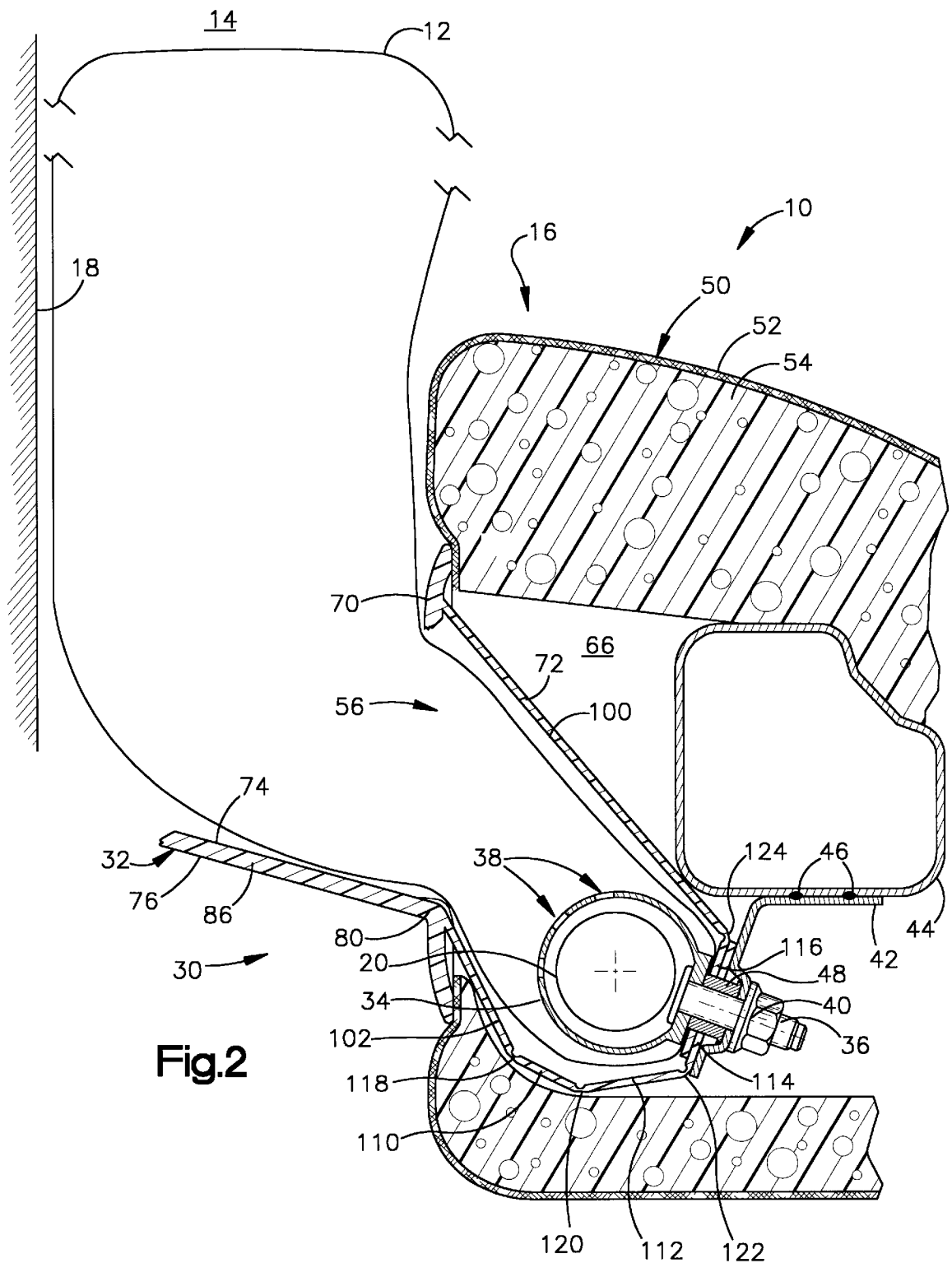
FIG. 2 is a view similar to FIG. 1 showing parts in different positions.
Figure 3:
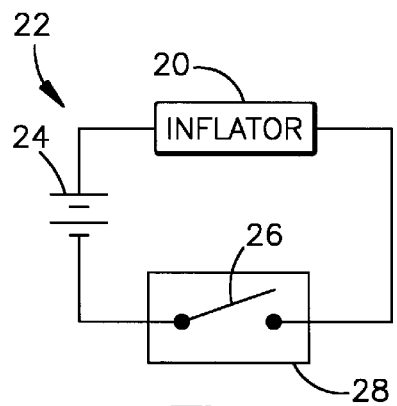
FIG. 3 is a schematic view of an electrical circuit including a part of the apparatus of FIG. 1.

As shown schematically in FIG. 3, the inflator 20 is included in an electrical circuit 22 with a power source 24 and a normally open switch 26. The power source 24 is preferably the vehicle battery and/or a capacitor. The switch 26 is part of a sensor 28 which senses a condition indicating the occurrence of a vehicle crash. In the preferred embodiment of the present invention shown in the drawings, the inflator 20 is actuated upon the occurrence of a side impact vehicle crash. In a side impact vehicle crash, an impact is directed against the vehicle in a direction extending from side-to-side in the schematic views of FIGS. 1 and 2. Accordingly, the crash-indicating condition sensed by the sensor 28 may comprise, for example, sudden transverse vehicle acceleration or crushing of the door 18 or another side portion of the vehicle.

If the crash-indicating condition sensed by the sensor 28 is at or above a predetermined threshold level, it indicates the occurrence of a side impact crash having at least a predetermined threshold level of severity. The threshold level of crash severity is a level at which inflation of the air bag 12 is desired to help protect an occupant of the seat 16. The switch 26 then closes and electric current is directed to the inflator 20 to actuate the inflator 20. The inflator 20 then emits a large volume of inflation fluid which flows into the air bag 12 to inflate the air bag 12.

The air bag 12 and the inflator 20 are parts of an air bag module 30. The module 30 is an assembly of parts that are interconnected separately from the vehicle seat 16. In addition to the air bag 12 and the inflator 20, the interconnected parts of the module 30 include a deployment structure 32, a diffuser 34, and a pair of screw-threaded mounting studs 36 (one of which is shown in FIG. 2) projecting from the diffuser 34.

The deployment structure 32 encloses and conceals the other parts of the module 30 from view in the vehicle occupant compartment 14. The diffuser 34 is a generally cylindrical part surrounding the inflator 20 and has a plurality of openings 38 for directing inflation fluid to flow radially outward from the inflator 20 to the air bag 12. The mounting studs 36 and a corresponding pair of nuts 40 fasten the module 30 to a mounting bracket 42 which, in turn, is fastened to the frame 44 of the seat 16 by welds 46. The frame 44 may be either the seat back frame or the seat bottom frame. As described fully below, a pair of screw-threaded bushings 48 are received over the studs 36 between the bracket 42 and the diffuser 34.

Figure 4:
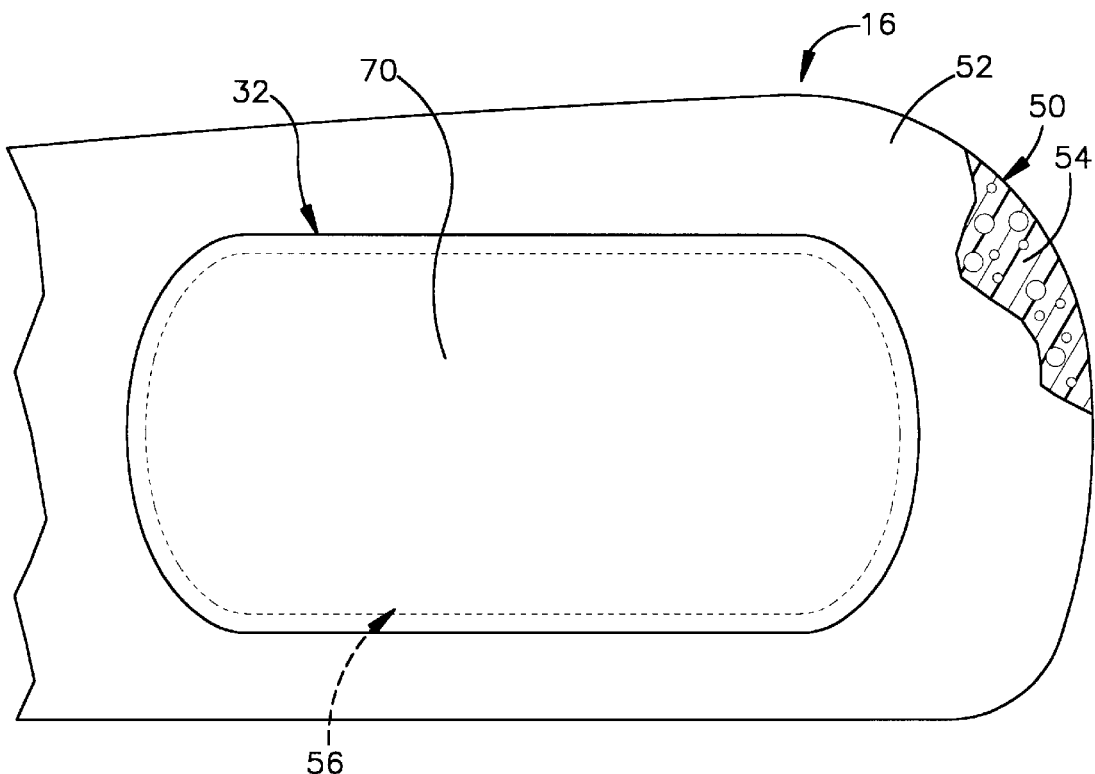
FIG. 4 is a view taken on line 4—4 of FIG. 1.

A seat cushion 50 covers the frame 44. The seat cushion 50 includes a cover layer 52 on a compressible base 54. The cover layer 52 is preferably formed of fabric or leather. The base 54 is preferably formed of elastomeric foam. The cover layer 52 and the base 54 together define a deployment opening 56 at the side of the seat cushion 50 facing the door 18. Although the deployment opening 56 has a generally rectangular peripheral shape with rounded corners and rounded ends, as shown in FIG. 4, it could alternatively have any other suitable peripheral shape. The seat cushion 50 further defines a cavity 66 extending inward from the deployment opening 56 to the frame 44. The air bag module 30 is received in the cavity 66, and is mounted on the frame 44 within the cavity 66.

Figure 5:
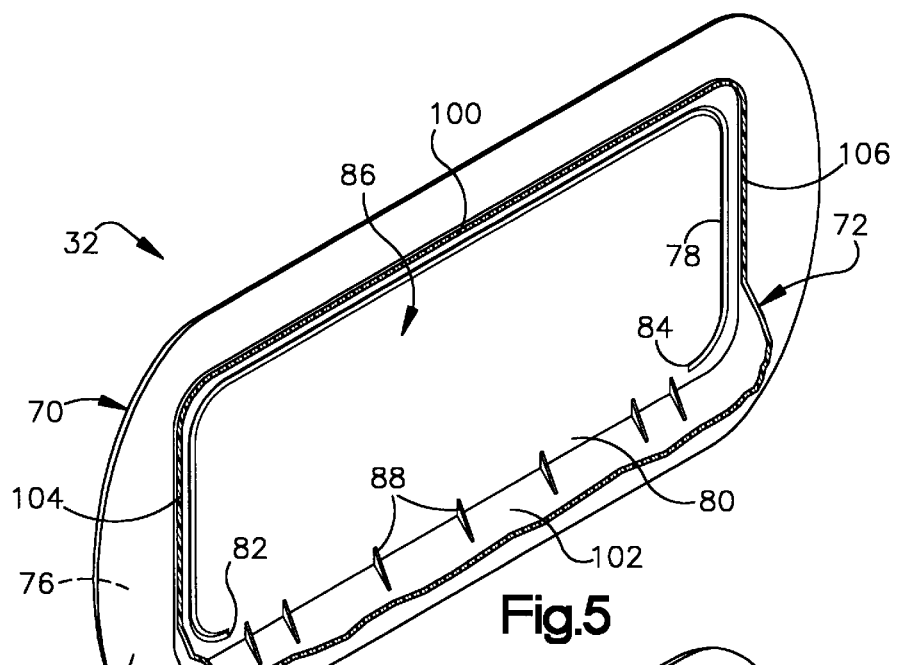
FIG. 5 is a partial isometric view of a part of the apparatus of FIG. 1.
Figure 6:
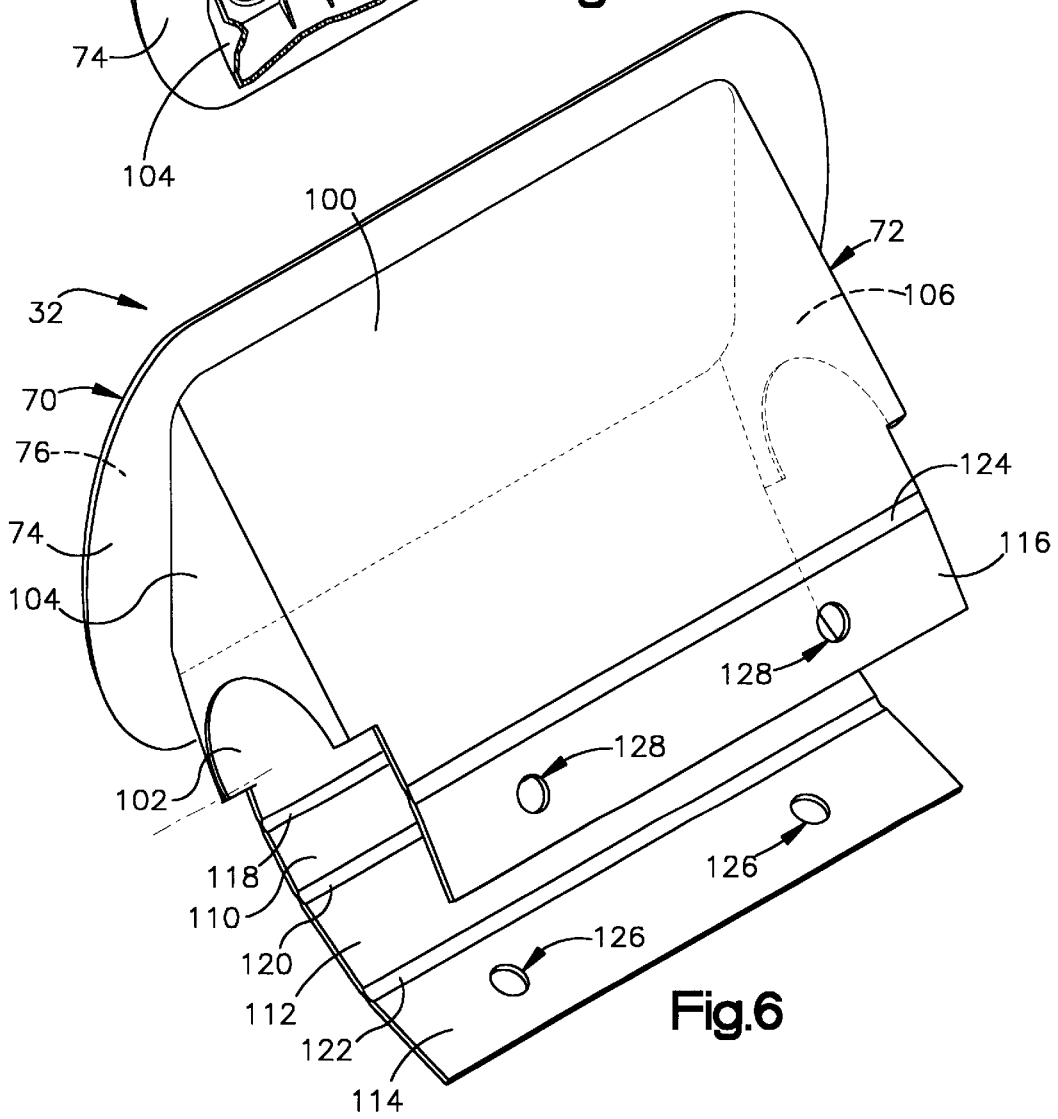
FIG. 6 is a full isometric view of the part shown partially in FIG. 5.

As shown in FIGS. 5 and 6, the deployment structure 32 in the preferred embodiment of the present invention includes a panel 70, and further includes an enclosure wall structure 72 projecting from one side of the panel 70. The deployment structure 32 is formed as a unitary part consisting of a single, continuous body of molded plastic material which defines both the panel 70 and the enclosure wall structure 72. This can be accomplished with any suitable injection molding process known in the art, and with any suitable plastic material such as, for example, Dupont DYM 350 or DYM 500.

The panel 70 has oppositely facing inner and outer side surfaces 74 and 76. The entire outer side surface 76 is a Class A surface. The outer side surface 76 may thus have any finish suitable for continuing the trim theme of the vehicle at the side of the seat 16.

The inner side surface 74 of the panel 70 has a notch 78 which is elongated in a generally U-shaped configuration (FIG. 5). The notch 78 defines a coextensive stress riser which is rupturable under the influence of the inflating air bag 12. A hinge portion 80 of the panel 70 extends longitudinally between opposite ends 82 and 84 of the notch 78. In this configuration, the notch 78 defines three sides of a generally rectangular deployment door 86 within the panel 70. The hinge 80 supports the deployment door 86 for pivotal movement from a closed position (FIG. 1) to an open position (FIG. 2) upon rupturing of the stress riser at the notch 78.

As indicated in FIG. 2, the hinge 80 is a living hinge. By "living hinge" it is meant that the plastic material at the hinge 84 does not rupture under stress induced by the inflating air bag 12. In accordance with this feature of the present invention, a plurality of gussets 88 (FIG. 5) are preferably included in the structure of the panel 70 to reinforce panel 70 at the hinge 80.

The panel 70 has a peripheral shape that closely matches the shape of the deployment opening 56 in the seat cushion 50. However, the panel 70 is substantially larger than the deployment opening 56. The panel 70 thus extends fully across the deployment opening 56 to close the deployment opening 56, and also projects outward from the deployment opening 56. Preferably, the panel 70 applies a compressive load to the seat cushion 50 around the deployment opening 56 so that the base 54 exerts an elastic bias outward against the panel 70. This ensures that the panel 70 is engaged firmly with the seat cushion 50 fully around the deployment opening 56 without being fastened directly to the seat cushion 50. However, the panel 70 could alternatively be fastened directly to the seat cushion 50 in any suitable manner known in the art.

The enclosure wall structure 72 has a generally rectangular configuration defined by an opposed pair of side walls 100 and 102 and an opposed pair of end walls 104 and 106 (FIGS. 5 and 6). The walls 100–106 surround the deployment door 86, the notch 78 and the hinge 80. The gussets 88 extend across the hinge 80 between the deployment door 86 and the adjacent side wall 102.

As best shown in FIG. 6, the enclosure wall structure 72 has a plurality of elongated mounting flaps projecting from the side walls 100 and 102. These include first, second and third mounting flaps 110, 112 and 114 projecting successively from one side wall 102, and a fourth mounting flap 116 projecting from the other side wall 100. A first living hinge 118 connects the first mounting flap 110 directly to the adjacent side wall 102. Second and third living hinges 120 and 122 successively interconnect the first and second mounting flaps 110 and 112 and the second and third mounting flaps 112 and 114. A fourth living hinge 124 connects the fourth mounting flap 116 directly to the other side wall 100. The living hinges 118–124 are defined by relatively thin sections of the plastic material of which the deployment structure 32 is formed. A pair of apertures 126 extend through the third mounting flap 114. A matching pair of apertures 128 extend through the fourth mounting flap 116.

Figure 7:
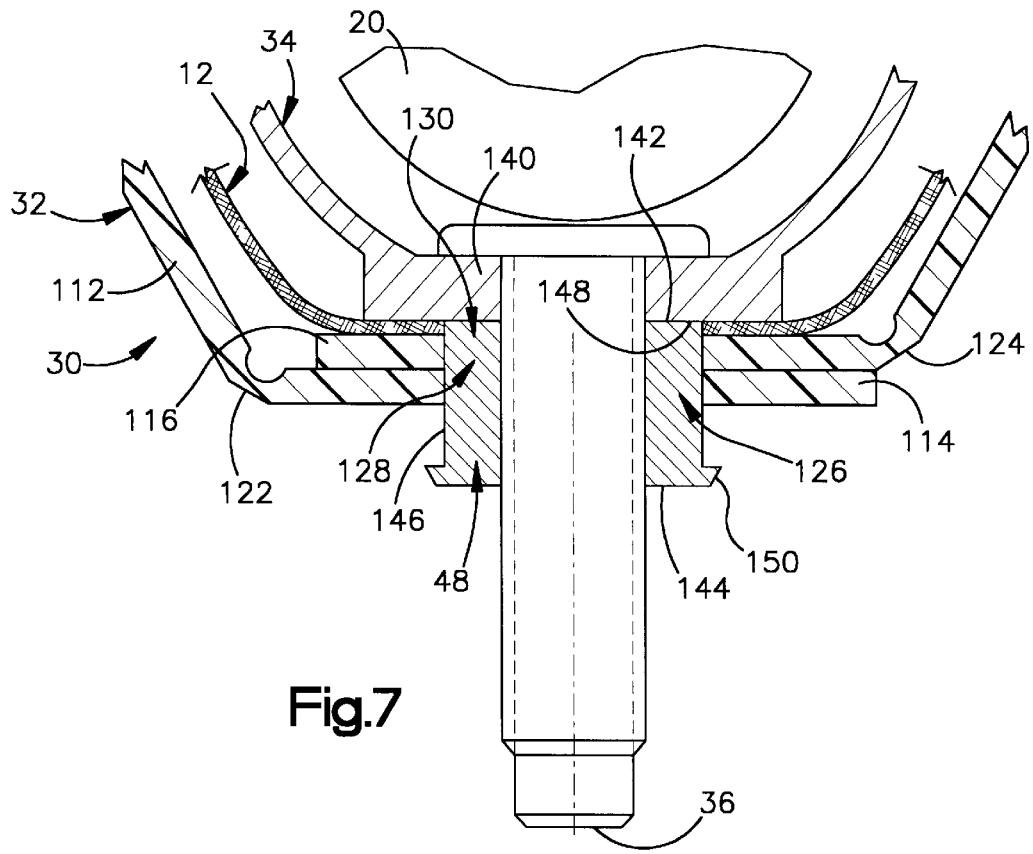
FIG. 7 is an enlarged partial view of parts of the apparatus of FIG. 1.

As noted above, the module 30 (FIG. 1) is assembled separately from the bracket 42 upon which it is mounted in the seat 16. When the module 30 is being assembled, the inflator 20 is inserted and secured within the diffuser 34 in a known manner. The bushings 48 are screwed onto the mounting studs 36 projecting from the diffuser 34. The inflator 20 and the diffuser 34 are then received together within the air bag 12, as shown partially in enlarged detail in FIG. 7. The air bag 12 has a pair of apertures 130 (one of which is shown in FIG. 7) through which the bushings 48 and the studs 36 extend outward from within the air bag 12. Those interconnected parts of the module 30 are received within the enclosure wall structure 72. The third and fourth mounting flaps 114 and 116 are then moved pivotally about the living hinges 122 and 124 to adjoining positions in which the bushings 48 and studs 36 extend outward through aligned pairs of the apertures 126 and 128. The air bag 12, the inflator 20, and the diffuser 34 are thus enclosed within the enclosure wall structure 72.

As further shown in FIG. 7, the studs 36 project from a base wall 140 of the diffuser 34. Each bushing 48 has an annular upper end surface 142 (as viewed in FIG. 7), an annular lower end surface 144, and a cylindrical side surface 146 extending longitudinally between the upper and lower end surfaces 142 and 144. The bushings 48 are screwed onto the studs 36 to positions in which their upper end surfaces 142 abut a lower side surface 148 of the base wall 140. Each bushing 48 in the preferred embodiment of the present invention further has a flange 150 projecting radially outward at its lower end. The flange 150 preferably has a hexagonal peripheral configuration for engagement by a wrench or a socket driver. The bushings 48 in the preferred embodiment are formed of steel.

When the bushings 48 and the studs 36 are received through the apertures 130 in the air bag 12, the air bag material surrounding the apertures 130 is stretched over the flanges 150 at the lower ends of the bushings 48. The air bag material then snaps resiliently against the cylindrical side surfaces 146 of the bushings 48 so that the bushings 48 are received through the apertures 130 in interference fits. The plastic material of the mounting flaps 114 and 116 also is stretched over the flanges 150 when the bushings 48 and the studs 36 are received through the aligned apertures 126 and 128, and also snaps resiliently against the cylindrical side surfaces 146 to establish interference fits with the bushings 48. The assembled module 30 (FIG. 7) is then fastened to the bracket 42 (FIG. 8).

Figure 8:
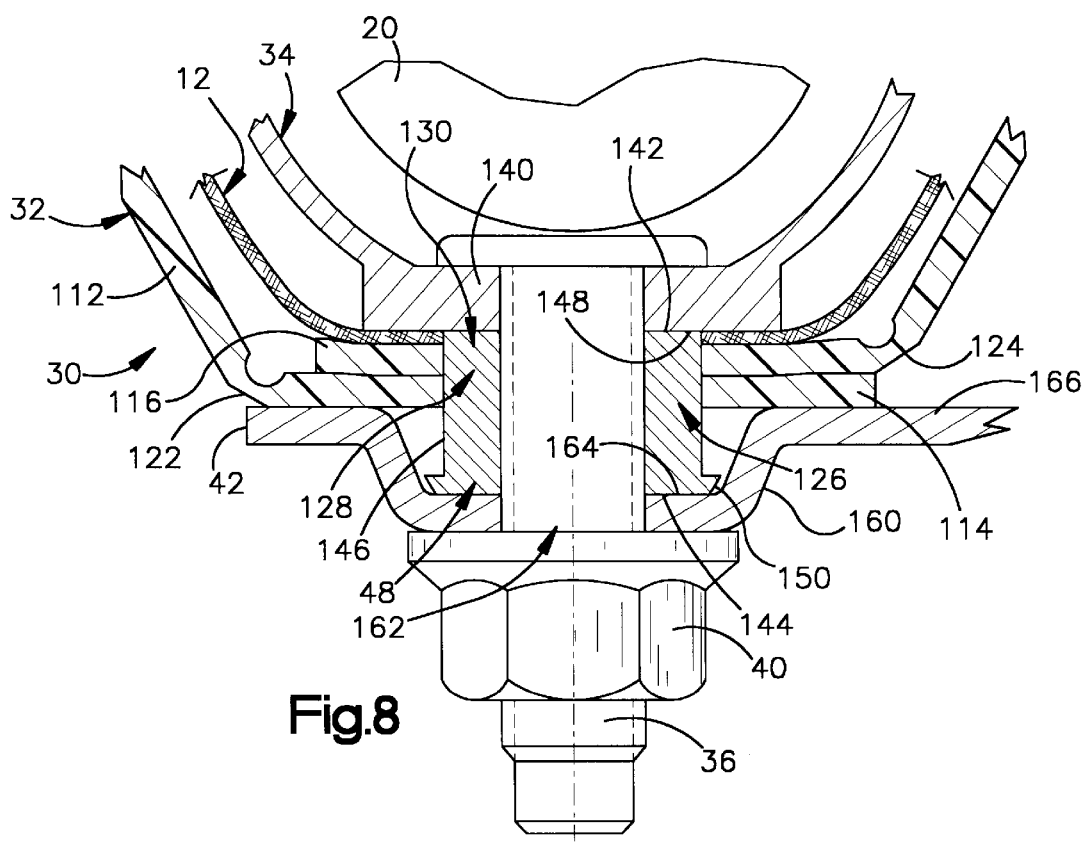
FIG. 8 is an enlarged partial view showing the parts of FIG. 7 fastened to another part of the apparatus of FIG. 1.

The bracket 42 has a pair of recessed portions 160, one of which is shown in FIG. 8, with a corresponding pair of apertures 162 for receiving the studs 36 on the module 30. Each recessed portion 160 of the bracket 42 has an annular inner surface 164 surrounding the corresponding aperture 162. An upper side surface 166 of the bracket 42 surrounds the recessed portions 160.

The module 30 is placed upon the mounting bracket 42 such that the studs 36 extend through the apertures 162. The studs 36 are receivable through the apertures 162 until the lower end surfaces 144 of the bushings 48 move into abutment with the annular inner surfaces 164 of bracket 42. The nuts 40 are then received on the studs 36 and are tightened against the bracket 42 to secure the module 30 in place on the bracket 42.

When the nuts 40 are tightened onto the studs 36, they draw the studs 36 and the diffuser 34 downward, as viewed in FIG. 8, relative to the bracket 42. The nuts 40 and the studs 36 then apply a clamping load which stresses the air bag 12 and the mounting flaps 114 and 116 compressively between the opposed side surfaces 148 and 166 of the diffuser 34 and the bracket 42. The air bag 12 and the mounting flaps 114 and 116 are deflectable under the clamping load, and may experience creep under the clamping load. The bushings 48 also are compressively stressed under the clamping load. However, the bushings 48 are essentially indeflectable under the clamping load, and extend longitudinally over the studs 36 fully between the bracket 42 and the base wall 140 of the diffuser 34 to space those parts from each other along the lengths of the studs 36. The bushings 48 thus block movement of the diffuser 34 toward the bracket 42. This ensures that the diffuser 34 remains tightly fastened to the bracket 42 by preventing movement of the diffuser 34 through clearance that may result from creep in the air bag 12 and the mounting flaps 114 and 116.

From the foregoing description of the invention, those skilled in the art will perceive improvements, changes and modifications. For example, the bushings 48 in the preferred embodiment of the present invention are one-piece structures extending fully between the diffuser 34 and the mounting bracket 42. However, a bushing constructed in accordance with the present invention could alternatively comprise a plurality of interconnected pieces, or a plurality of separate pieces which together extend between a pair of clamping parts in substantially the same manner. Moreover, the bushings 48 described above are formed of steel, but a bushing constructed in accordance with the present invention could be formed of any other material that is not compressively deflectable under the applied clamping load. Such improvements, changes and modifications within the skill of the art are intended to be covered by the appended claims.

Having described the invention, the following is claimed:

1. Apparatus comprising:

an inflatable vehicle occupant protection device comprising a first compressively deflectable structure;

a cover for said protection device, said cover comprising a second compressively deflectable structure;

a pair of clamping parts;

a fastener structure comprising a stud extending longitudinally between said clamping parts, said fastener structure applying a clamping load to said clamping parts, at least one of said deflectable structures being compressively stressed by said clamping load; and a bushing which is indeflectable under said clamping load, said bushing extending over said stud fully between said clamping parts to space said clamping parts from each other, whereby said apparatus comprises a hard joint in which the spacing between said clamping parts is unaffected by creep in said one of said deflectable structures.

2. Apparatus as defined in claim 1 wherein one of said clamping parts comprises a diffuser having a plurality of inflation fluid outlet openings, the other of said clamping parts comprising a mounting bracket which supports said diffuser in a vehicle.

3. Apparatus as defined in claim 1 wherein said bushing has an internal screw thread engaging a screw thread on said stud.

4. Apparatus as defined in claim 1 wherein said bushing is formed of steel.

5. Apparatus as defined in claim 1 wherein said bushing is a one-piece structure.

6. Apparatus as defined in claim 1 wherein said stud extends through an aperture in said one of said deflectable structures.

7. Apparatus as defined in claim 1 wherein said one of said deflectable structures is one of a plurality of mounting flap portions of said cover which are compressively stressed between said clamping parts.

8. Apparatus as defined in claim 7 wherein said stud extends through aligned apertures in said mounting flap portions of said cover.

9. Apparatus as defined in claim 8 wherein said bushing comprises a cylindrical part with a flange projecting radially outward from said apertures.

10. Apparatus as defined in claim 8 wherein said stud further extends through an aperture in said protection device.

* * * * *